United States Patent
Blaszczyk et al.

(10) Patent No.: US 6,926,987 B2
(45) Date of Patent: Aug. 9, 2005

(54) FUEL CELL SYSTEM AND METHOD FOR OPERATING THE SAME

(75) Inventors: Janusz Blaszczyk, Richmond (CA); Wolfram Fleck, Coquitlam (CA)

(73) Assignee: Ballard Power Systems AG, Kirchheim-Narbern (DE)

( * ) Notice: Subject to any disclaimer, the term of this patent is extended or adjusted under 35 U.S.C. 154(b) by 236 days.

(21) Appl. No.: 10/253,390

(22) Filed: Sep. 24, 2002

(65) Prior Publication Data

US 2003/0064274 A1 Apr. 3, 2003

(30) Foreign Application Priority Data

Sep. 25, 2001 (EP) .............................................. 01122923

(51) Int. Cl.$^7$ ................................................ H01M 2/02
(52) U.S. Cl. .............................. 429/34; 429/13; 429/17
(58) Field of Search ............................... 429/13, 17, 34

(56) References Cited

U.S. PATENT DOCUMENTS

| | | | |
|---|---|---|---|
| 4,537,839 A | 8/1985 | Cameron | 429/20 |
| 5,059,494 A | * 10/1991 | Vartanian et al. | 429/17 |
| 6,124,054 A | 9/2000 | Gorman et al. | 429/34 |
| 6,277,508 B1 | 8/2001 | Reiser et al. | 429/17 |
| 6,309,770 B1 | * 10/2001 | Nagayasu et al. | 429/19 |
| 2001/0014415 A1 | * 8/2001 | Iio et al. | 429/22 |
| 2002/0094467 A1 | 7/2002 | Nonobe et al. | 429/34 |
| 2002/0094468 A1 | 7/2002 | Miura et al. | 429/34 |
| 2002/0094469 A1 | 7/2002 | Yoshizumi et al. | 429/34 |
| 2002/0142200 A1 | 10/2002 | Formanski et al. | 429/17 |
| 2003/0027024 A1 | 2/2003 | Iio et al. | 429/19 |
| 2003/0039870 A1 | 2/2003 | Busenbender | 429/13 |
| 2003/0077488 A1 | 4/2003 | Yamamoto et al. | 429/17 |

FOREIGN PATENT DOCUMENTS

| | | |
|---|---|---|
| EP | 0 948 070 A1 | 10/1999 |
| EP | 1 018 774 A1 | 7/2000 |

OTHER PUBLICATIONS

Astract of EP 1 018 774 A1, esp@cenet database, Jul. 12, 2000.
Abstract of DE 199 44 541 A1, esp@cenet database, Mar. 29, 2001.

* cited by examiner

*Primary Examiner*—Dah-Wei Yuan
(74) *Attorney, Agent, or Firm*—Seed IP Law Group PLLC

(57) ABSTRACT

A fuel cell system and associated method allows for continuous operation of the fuel cell system with fuel recirculation, without the necessity for periodic purging. A portion of the anode exhaust is not recirculated but is continuously bled from the anode exhaust line. Preferably, less than 5% by volume of the anode exhaust is allowed to bleed continuously from the anode exhaust. The bleed line may be connected to a catalytic reactor which combusts the unused fuel. The cathode exhaust may be used as the oxidant for the catalytic reactor. The flow of exhaust to the catalytic reactor may be controlled to ensure that the concentration of hydrogen in the catalytic reactor is no higher than 50% of the lower limit of inflammability for hydrogen.

10 Claims, 1 Drawing Sheet

FUEL CELL SYSTEM AND METHOD FOR OPERATING THE SAME

CROSS-REFERENCE TO RELATED APPLICATION

This application claims priority to European Patent Application No. 01122923.4, filed Sep. 25, 2001, which application is incorporated herein by reference in its entirety.

BACKGROUND OF THE INVENTION

1. Field of the Invention

The invention relates to a fuel cell system and a method for operating the same.

2. Description of the Related Art

In fuel cell systems where hydrogen gas is used as fuel, the anode exhaust of the fuel cell stack may be recycled back to the fuel cell's anode to make use of the surplus hydrogen in the exhaust. To prevent accumulation of impurities contained in the hydrogen gas inside the anode compartments of the fuel cell stack, however, the hydrogen has to be purged from time to time. In DE 199 44 541 A1 such a fuel cell system is disclosed. In addition to problems arising due to the interruption of the fuel cell operation, purging of hydrogen to the ambient environment may not be acceptable, as discharging of raw fuel may be a problem to the environment. The inclusion of a purifying unit in the recycling loop to avoid purging has been suggested, however while reactive impurities might be removed by appropriate catalytic reactions, inert impurities cannot be easily removed. If, as disclosed in another embodiment of DE 199 44 541 A1, the purged hydrogen is burned in a catalytic burner, the catalytic component is highly stressed by the frequent high load of hydrogen pulses.

Accordingly, there remains a need for a fuel cell system where impurities can be removed from the same without purging.

BRIEF SUMMARY OF THE INVENTION

The present system and method allow for continuous operation of a fuel cell system and avoid releasing unused hydrogen to the environment.

In one embodiment, the present system comprises a fuel cell comprising an anode and a cathode, a fuel feed line connected to the anode, an oxidant feed line connected to the cathode, an anode exhaust line, a cathode exhaust line, a recirculation line configured to recirculate exhaust from the anode to the fuel feed line, and a bleed line connected to the anode exhaust line and configured to allow a portion of the exhaust from the anode to bleed continuously from the anode exhaust line. In another embodiment, the bleed line is connected to a catalytic reactor, which may be configured to also receive exhaust from the cathode exhaust line.

One embodiment of the present method for operating a fuel cell system comprises feeding a fuel to an anode of a fuel cell, feeding oxidant to a cathode of the fuel cell, recirculating a portion of the anode exhaust to the anode of the fuel cell, and continuously bleeding a portion of the anode exhaust. The portion of the exhaust continuously bled from the anode exhaust gas may be burned in a catalytic reactor, which may be configured to also receive exhaust from the cathode.

The present system and method can be advantageously used in vehicles where a fuel cell system is used to supply electric energy for traction and/or low power requirements. The present system and method is highly favorable for hydrogen fuel cell systems. It can also be applied, however, to fuel cell systems with a gas production system where hydrogen is produced from a fuel, e.g., by a reforming process.

These and other aspects will be evident upon reference to the attached Figures and following detailed description.

BRIEF DESCRIPTION OF THE DRAWING(S)

DETAILED DESCRIPTION OF THE INVENTION

Figure 1:
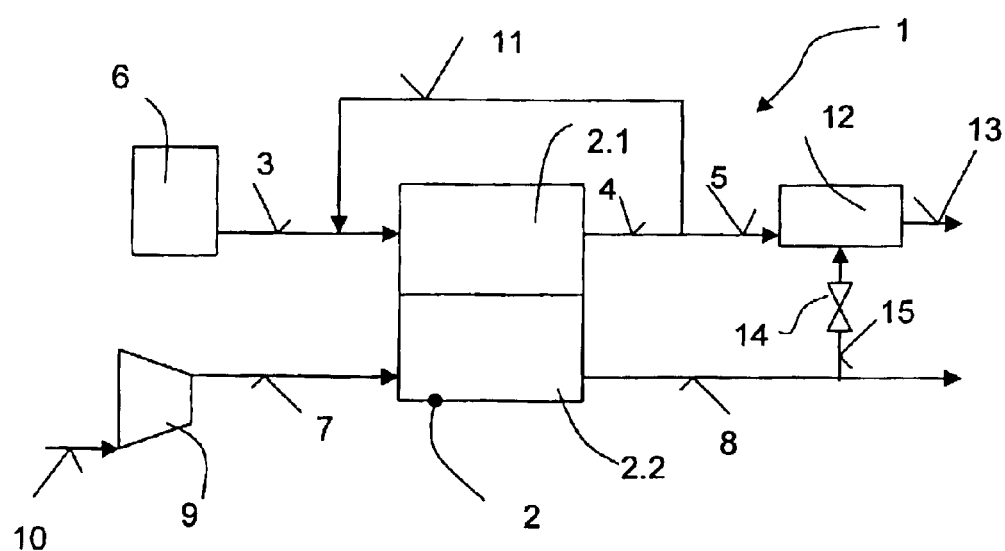
FIG. 1 is a schematic illustration of an embodiment of the present fuel cell system.

FIG. 1 shows one embodiment of the present fuel cell system. Fuel cell system 1 comprises a fuel cell 2, typically a fuel cell stack, having a multiplicity of single fuel cells stacked together for producing a desired amount of electric power. Fuel cell 2 has an anode 2.1 with an anode feed line 3 for feeding hydrogen to anode 2.1 and an anode exhaust line 4 to remove the exhaust from anode 2.1, a cathode 2.2 with a cathode feed line 7 for feeding oxidant to cathode 2.2 and a cathode exhaust line 8 to remove the exhaust from cathode 2.2. The anode exhaust comprises mainly surplus hydrogen and product water from fuel cell 2.

The oxidant source for cathode 2.2 is typically air that is fed to a compressor 9 by line 10 and is compressed by compressor 9 to an appropriate operating pressure.

Fuel cell system 1 is preferably a hydrogen system where hydrogen as a fuel is fed to the fuel cell 2 from a storage tank 6. Storage tank 6 can be a high pressure tank and/or a pump can be arranged between storage tank 6 and fuel cell 2 to establish the appropriate operating pressure of the hydrogen medium.

According to the present system and method, most of the hydrogen in the anode exhaust is recycled in a recirculation line 11 from anode exhaust line 4 to anode feed line 3, while a small of the anode exhaust is fed continuously to a bleed line 5. Advantageously less than 5%, and typically only 1–2%, of the hydrogen volume in the anode exhaust is fed to bleed line 5. As there is a continuous amount of hydrogen bleeding from the exhaust, impurities in the anode exhaust cannot accumulate, dilute the hydrogen in fuel cell 2, and subsequently reduce the fuel cell efficiency.

Bleed line 5 may be connected to a catalytic reactor 12 where the hydrogen bled at steady flow rate from the anode exhaust line 4 can be combined in reactor 12 with oxidant from the cathode exhaust. A suitable reactor 12 is a catalytic burner. In one embodiment, the portion of the anode exhaust bled to the catalytic reactor is controlled such that the concentration of hydrogen in the catalytic reactor does not exceed the lower limit of inflammability for hydrogen. In another embodiment, the portion of the at least one of the anode exhaust or the cathode exhaust is directed to the catalytic reactor such that the concentration of hydrogen in the catalytic reactor does not exceed the lower limit of inflammability for hydrogen, and in another embodiment is no higher than 50% of the lower limit of inflammability for hydrogen.

A steady air flow rate can be drained via line 15 from cathode exhaust line 8. Favorably, a constant back-pressure valve 14 mounted in line 15 ensures steady flow to maintain less than 50% of the hydrogen lower limit of inflammability in the reactor chamber, thus avoiding safety problems due to the hydrogen concentration in reactor 12. The hot reaction gas—mainly steam produced in catalytic reactor 12—can be removed through exhaust line 13.

Figure 2:
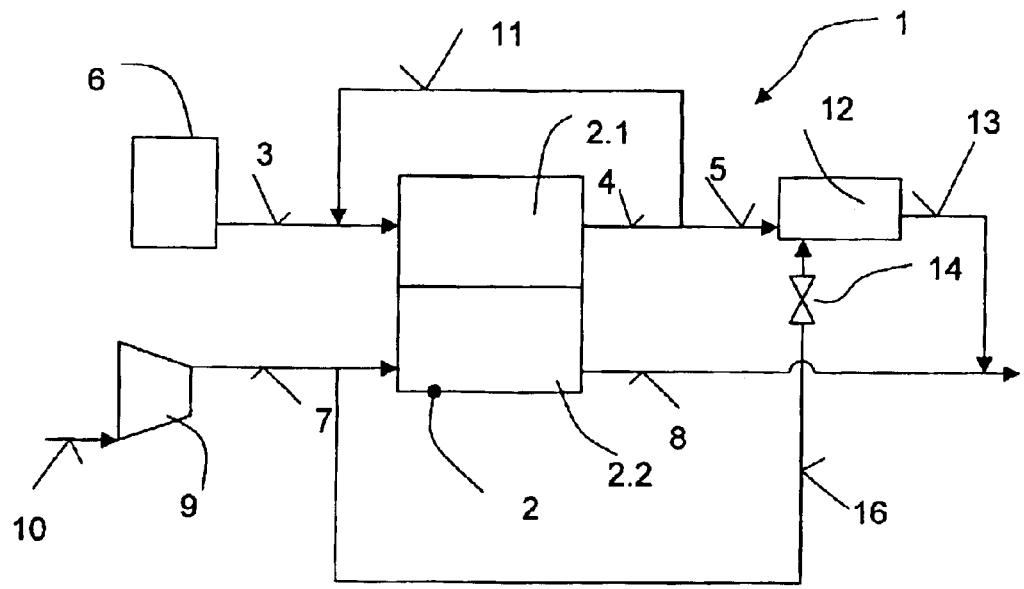
FIG. 2 is a schematic illustration of another embodiment of the present fuel cell system.

FIG. 2 shows another embodiment of the present system and method, with components having the same function as those in FIG. 1 being referred to with the same reference numbers. The air for the catalytic reaction in reactor 12 can be obtained from the area downstream of compressor 9 via line 16. If a compressor by-pass valve is installed to allow air to by-pass compressor 9, air can be obtained from downstream of the by-pass valve through line 16 and fed into reactor 12. It is advantageous to use constant back-pressure valve 14 in line 16 to allow for a secure path for the oxidant into reactor 12 to maintain safe operation conditions in reactor 12.

Additionally, hot gas from reactor 12 can be returned to the main exhaust line, e.g., the cathode exhaust line 8. The advantage of such a configuration is the avoidance of the formation of a steam cloud around the exhaust line 13, which might form when the water-rich hot gas cools while passing through exhaust line 13.

According to the present system and method unused fuel is not expelled from the fuel cell exhaust system as occurs using conventional purge systems known in the art. The fact that no fuel is discharged into the environment helps to protect the environment. When the present system and method is used in vehicles, the safety of operation increases, particularly in confined areas. Additionally, the acceptability of fuel cell vehicles can be increased through elimination of or size reduction of an optically visible steam cloud leaving exhaust line 13.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel cell system comprising:
   a fuel cell comprising an anode and a cathode;
   a fuel feed line connected to the anode;
   an oxidant feed line connected to the cathode;
   an anode exhaust line containing hydrogen;
   a cathode exhaust line;
   a recirculation line configured to recirculate exhaust from the anode to the fuel feed line; and
   a bleed line connecting the anode exhaust line to a catalytic reactor, wherein the bleed line is configured to allow less than 5% of the hydrogen volume in the exhaust from the anode to bleed continuously from the anode exhaust line, and wherein the hydrogen concentration within the catalytic reactor is maintained at less than the lower limit of inflammability for hydrogen.

2. The fuel cell system of claim 1, wherein the cathode exhaust line is connected to the catalytic reactor.

3. The fuel cell system of claim 2, further comprising a constant back-pressure valve disposed in the cathode exhaust line upstream of the catalytic reactor.

4. The fuel cell system of claim 1, further comprising a reactor exhaust line configured to recirculate exhaust from the catalytic reactor to the cathode exhaust line.

5. A method for operating a fuel cell system comprising:
   feeding hydrogen to an anode of a fuel cell;
   feeding oxidant to a cathode of the fuel cell;
   recirculating a portion of the anode exhaust to the anode of the fuel cell, wherein the anode exhaust contains hydrogen;
   continuously bleeding less than 5% of the hydrogen volume of the anode exhaust via a bleed line; and
   reacting the hydrogen of the bleed line in a catalytic reactor under conditions wherein the hydrogen concentration within the catalytic reactor is maintained at less than the lower limit of inflammability for hydrogen.

6. The method of claim 5, further comprising controlling the portion of the anode exhaust bled to the catalytic reactor such that the concentration of hydrogen in the catalytic reactor does not exceed 50% of the lower limit of inflammability for hydrogen.

7. The method of claim 6, wherein the concentration of hydrogen in the catalytic reactor is controlled by adjusting the portion of the anode exhaust bled to the reactor.

8. The method of claim 5, further comprising supplying at least a portion of the cathode exhaust to the catalytic reactor.

9. The method of claim 8, further comprising controlling the portion of at least one of the anode exhaust or the cathode exhaust directed to the catalytic reactor such that the concentration of hydrogen in the catalytic reactor does not exceed the lower limit of inflammability for hydrogen.

10. The method of claim 9, wherein the portion of at least one of the anode exhaust or the cathode exhaust directed to the catalytic reactor is controlled such that the concentration of hydrogen in the catalytic reactor is no higher than 50% of the lower limit of inflammability for hydrogen.

* * * * *